UNITED STATES PATENT OFFICE.

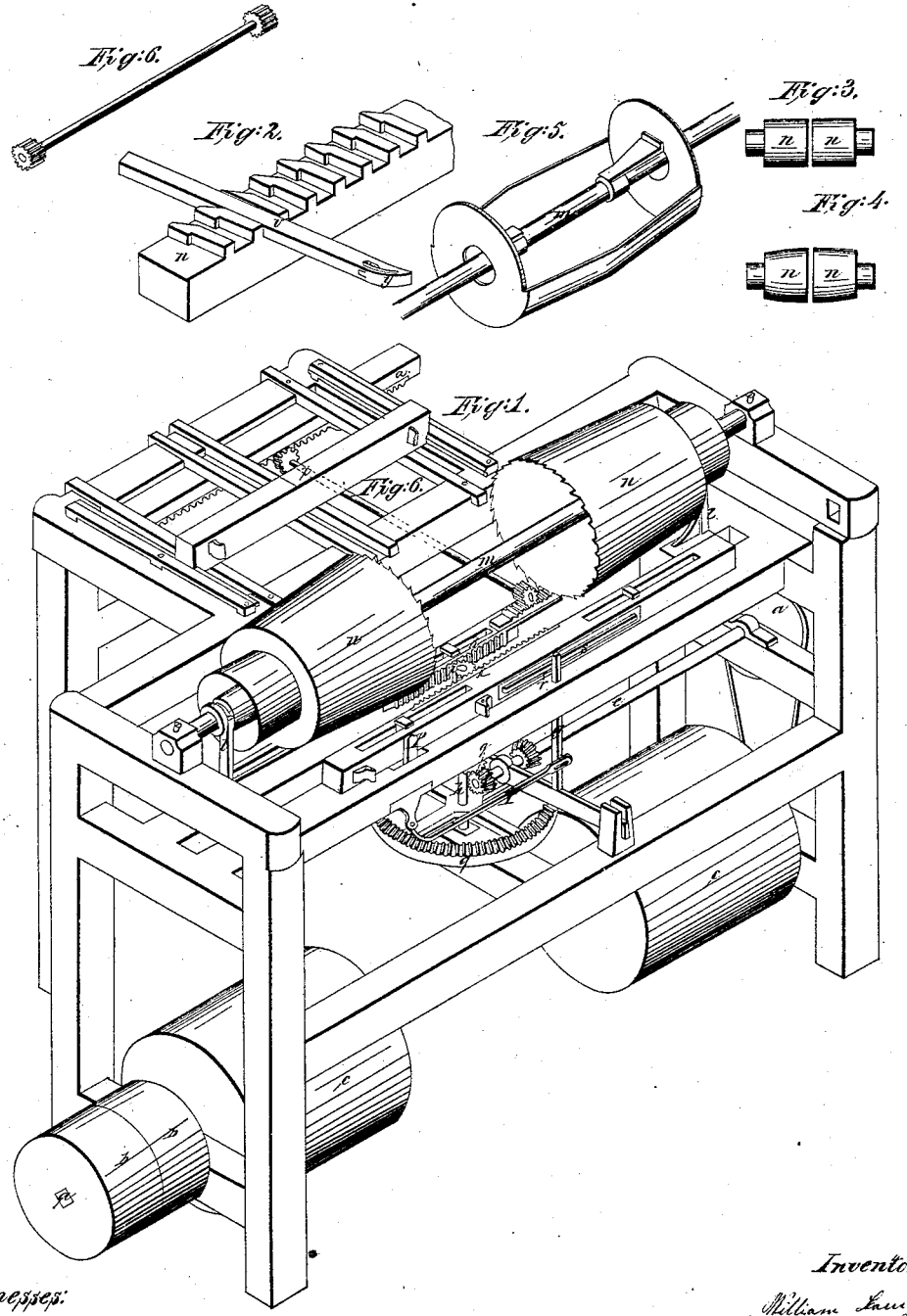

WM. LANCEY AND SOLYMAN MERRICK, OF SPRINGFIELD, MASSACHUSETTS.

MACHINE FOR SAWING STAVES.

Specification of Letters Patent No. 946, dated September 25, 1838.

*To all whom it may concern:*

Be it known that we, WILLIAM LANCEY and SOLYMAN MERRICK, of Springfield, in the county of Hampden and State of Massachusetts, have invented a new and useful Improvement in Cylinder Stave-Sawing Machines; and we do hereby declare that the following is a full and exact description.

The nature of our improvement consists in the use and application of two hollow conical saws, of about half the length of the stave to be sawed; these saws commence sawing at each end of the block or stave and proceed sufficiently near to the center to separate the stave from the block.

The objects to be attained by our improvement are as follows: to reduce the amount of timber wasted by the cut of the saw, by reducing the thickness of the plates, of which the saws are composed, in proportion to the reduced length of the saws, and also to reduce in like proportion, the amount of power necessary to saw a given number of staves; also to saw staves with greater facility.

To enable others skilled in the art to make and use our invention, we will proceed to describe its construction and operation.

We construct our saws $n$ $n$ Fig. 1, of steel or iron plate, and in size and form to correspond (when the saws are in contact) very nearly with the size and form of the cask for which the staves are to be sawed. We fasten the smaller end of the saws upon the periphery of two cast iron heads with hubs attached of sufficient length to cause them to revolve steadily upon the stationary shaft $m$; to these heads we attach pulleys to revolve the saws, and near the outer end of the hubs we turn grooves to admit the drivers $l$, $l$; these drivers we attach to the sliding racks $k$ $k$, the teeth of which are constantly engaged with the teeth of the pinion $i$, which is made fast to the end of the shaft $h$; upon another part of the shaft $h$ we attach two bevel gears $q$ $q$ of different diameters. We also attach two small bevel pinions $f$ $f$ to the shaft $e$, which shaft is driven by a belt which passes around a small pulley on the end of driving shaft $a$ and the pulley $d$ on the end of shaft $e$. It is evident that by engaging the teeth of one of the pinions $f$ with the teeth of the large bevel gear $q$, the saws $n$ $n$ will approach each other, and when nearly in contact, by engaging the other pinion $f$ with the smaller bevel gear $q$, the rectilinear motion of the saws will be reversed. In order to accomplish this change of movement, we attach a flanch $s$ to one of the racks $k$; also an upright rod $g$ to the bearing of the shaft $e$; to the rod $g$ we attach the pin $r$ which bears against the flanch $s$; we also attach two stops $o$ $o$ to the rack $k$; the stops alternately press the spring $p$, $p$, the other end of which takes on to a pin in the rod $g$. By this arrangement it will be sure that as the saws approach each other, one of the stops $o$ will press against the spring $p$, $p$, and cause the pin $r$ to bear against the under side of the flanch $s$, and as soon as the flanch $s$ passes the pin $r$, the pressure of the spring $p$ $p$ will throw the pinion $f$ into the smaller bevel gear, and also the pin $r$ to the upper side of the flanch $s$, and thereby reverse the rectilinear motion of the saws. As the saws recede, the change is effected in the same manner by the action of the opposite stop $o$ which presses the spring in the opposite direction.

The saws revolve by means of belts which pass around drums $c$ $c$ on the driving shaft $a$; these belts follow with the pulleys on the saws and traverse on the drums, which are made long enough for that purpose. The block to be sawed is held by the dogs in the block $x$ and is moved forward to coincide with the conical form of the saws, by the guide $v$, which slides between teeth on the under side of the rack $w$ which rack is attached to the block $x$; the guide $v$ is attached to the slide $u$, which is moved equally with the saws by means of a shaft Fig. 6 with two pinions of equal diameter, one of which takes into the teeth $t$ on one of the racks $k$ and the other into the teeth on the under side of slide $u$. We set the block for each succeeding stave by means of the teeth on the under side of rack $w$, and click $y$ on the end of guide $v$. Fig. 2 represents a section of rack $w$, guide $v$ and click $y$. As the guide passes out from the teeth, the projection on the click strikes the projection on the tooth which forces the click forward until it has passed the tooth, when it is thrown back to its original position by a slight spring which is fastened to the guide and presses against the click; it is then in a position to take into the next tooth which it forces forward by means of the inclination on the back of the tooth, and front of the click. The staves when sawed, drop into a semicircular box. Fig. 5, which is made a little longer than the staves—as large as the diameter of the saws will admit (when nearly in contact) and is made fast to the stationary shaft $m$.

We contemplate making the saws of equal diameter as in Fig. 3 for the purpose of sawing the staves straight longitudinally. We also contemplate making the longitudinal surface of the saws segments of a circle as in Fig. 4, for the purpose of leaving the staves in that form should it be desirable. We also contemplate placing the guide $v$ directly upon one of the racks $k$ and connect to the block $x$ so as to have the rack $w$ pass under the saws.

What we claim as our invention and desire to secure by Letters Patent, is—

The application of two saws made and operated upon in the manner herein described, or in any other way substantially similar.

WILLIAM LANCEY.
SOLYMAN MERRICK.

Witnesses:
WILLIAM BARTON,
JUSTIN WILLARD.